Dec. 1, 1936. G. A. OVERSTROM 2,062,760
FLEXIBLE SPRING SUPPORT
Filed Oct. 14, 1935 4 Sheets-Sheet 2
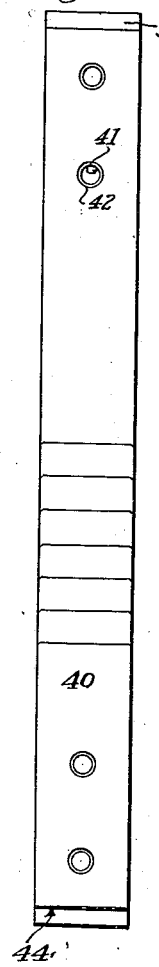
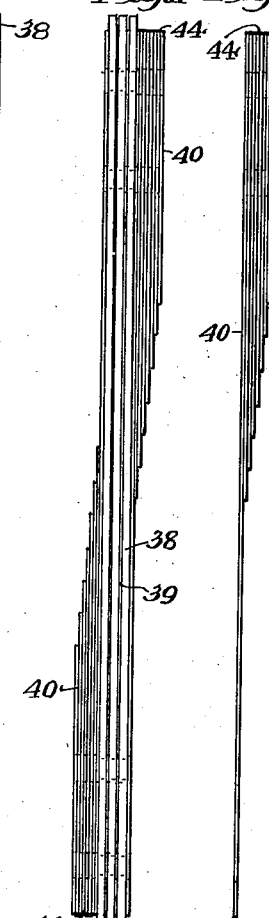
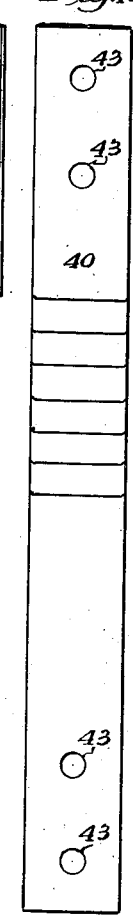
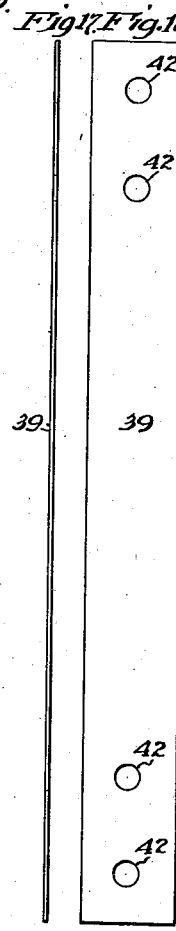
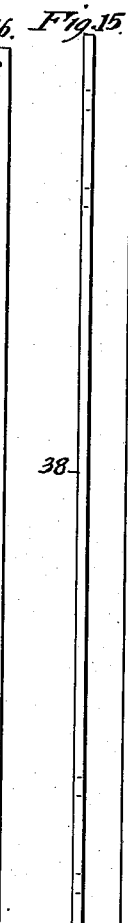
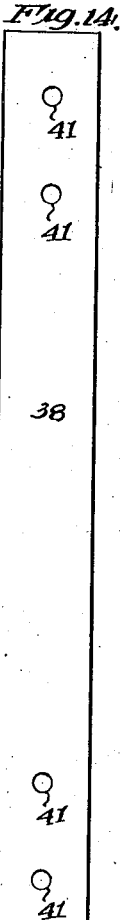
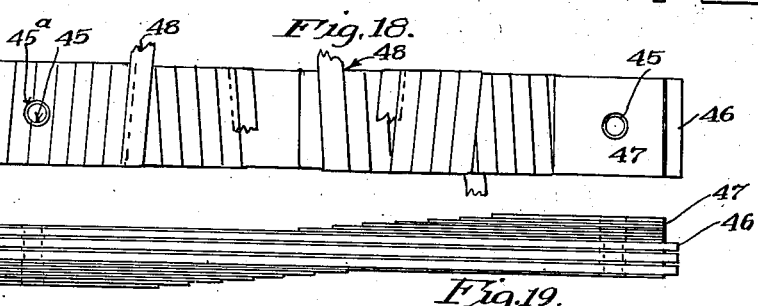
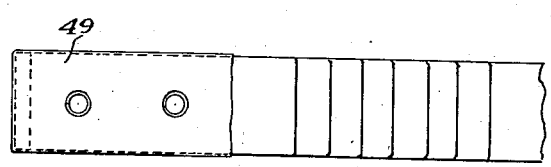
INVENTOR.
Gustave A. Overstrom.
BY Arthur P. Knight
Alfred W. Knight
ATTORNEYS.

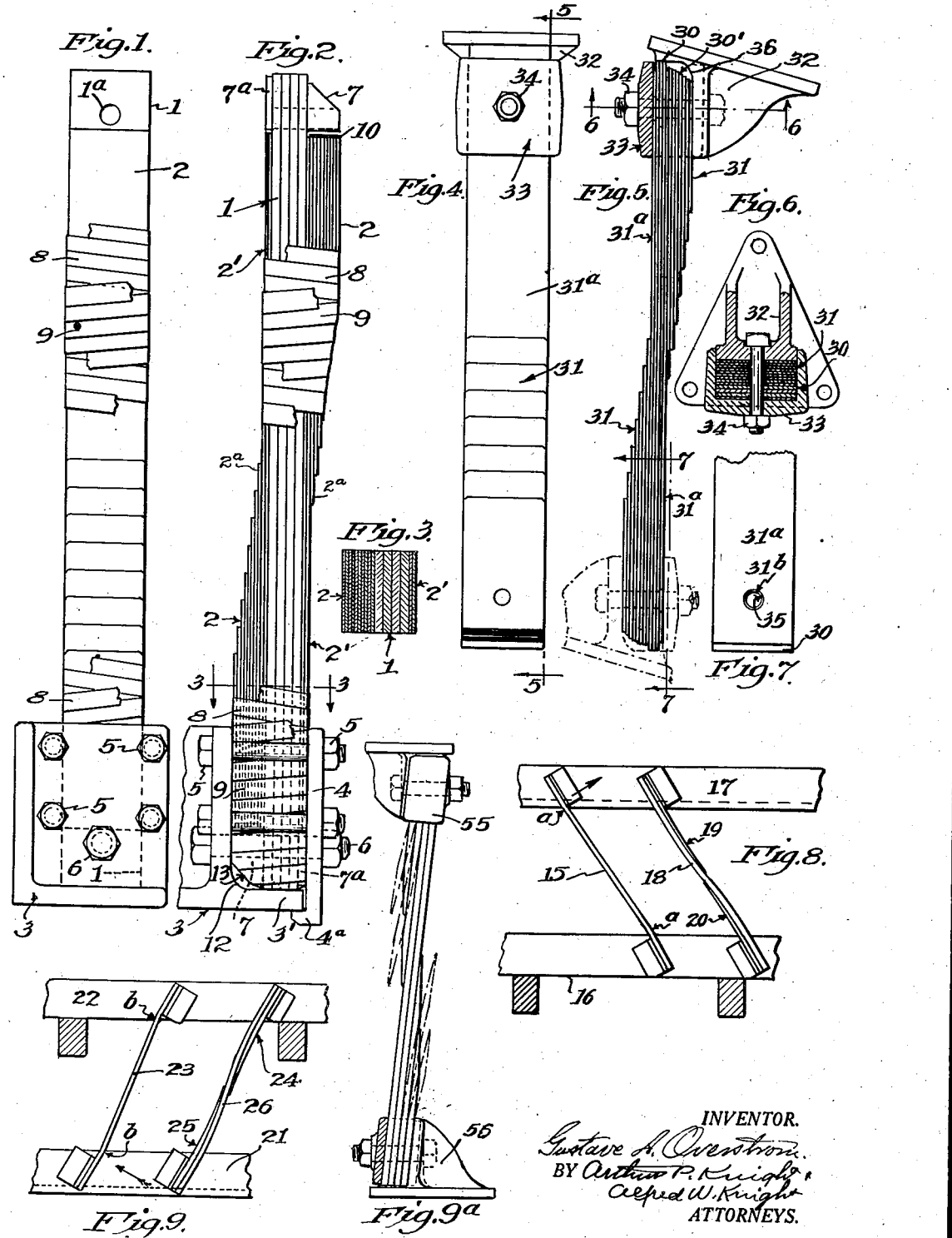

Dec. 1, 1936.  G. A. OVERSTROM  2,062,760
FLEXIBLE SPRING SUPPORT
Filed Oct. 14, 1935  4 Sheets-Sheet 3
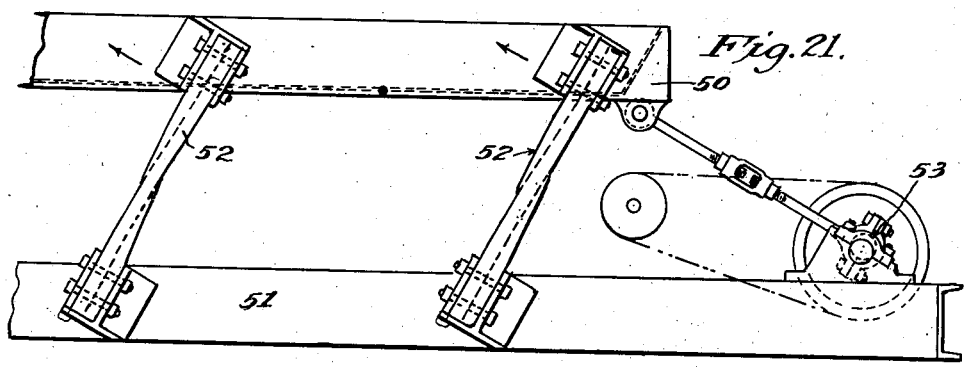
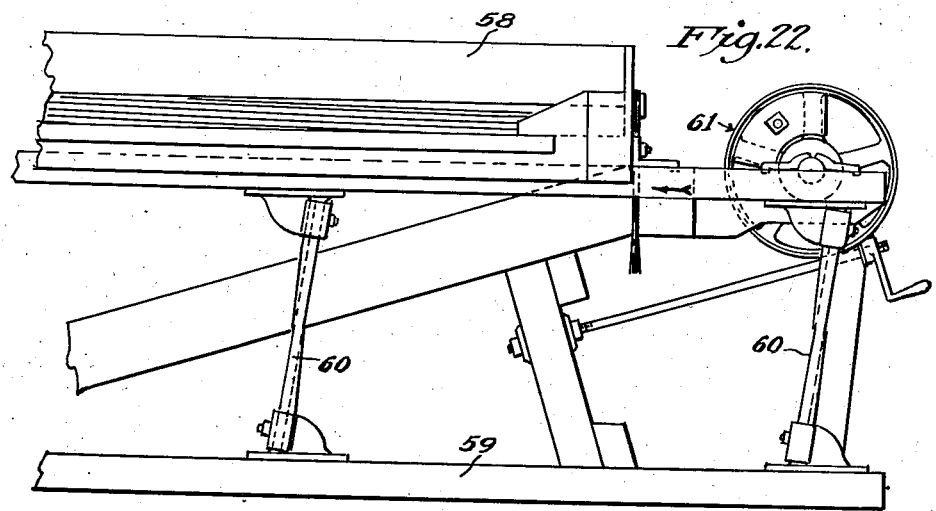
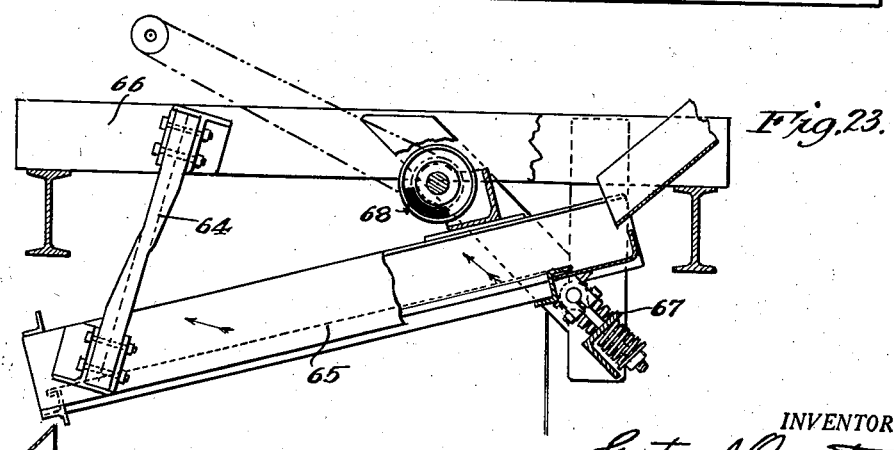
INVENTOR.
Gustave A. Overstrom
BY Arthur P. Knight
Alfred W. Knight
ATTORNEYS.

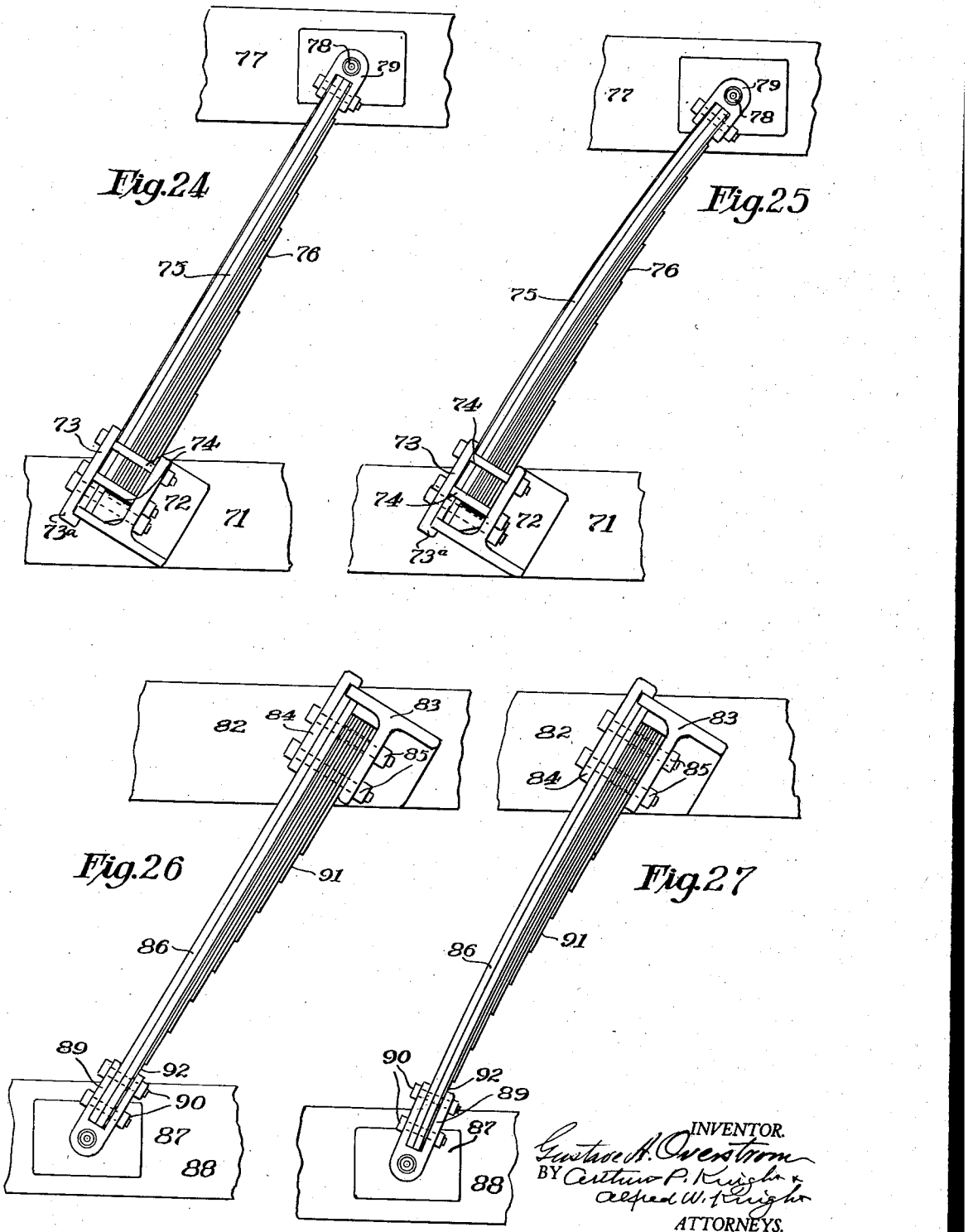

Patented Dec. 1, 1936

2,062,760

UNITED STATES PATENT OFFICE 2,062,760

FLEXIBLE SPRING SUPPORT

Gustave A. Overstrom, Big Sur, Calif.

Application October 14, 1935, Serial No. 44,921

14 Claims. (Cl. 267—1)

This invention relates to flexible spring supporting means for reciprocating, shaking or vibrating apparatus such as screens, tables, conveyors, etc., and pertains particularly to a flexible spring supporting means adapted to resiliently support a gravity load in such manner as to permit vibratory movement of such load through the agency of a suitable driving means.

In general, two types of construction may be provided where it is desired to resiliently support a gravity load, namely, constructions in which the supporting means are positioned in tensional and compressional supporting relation, respectively. These two types of supporting construction are conventionally designated as "hanging" and "strut" supports, respectively. In both types of construction, it is customary to so dispose the support "leg" that it extends in a general upward and downward position, and one end of the support is secured to a suitable fixed structure and the other end thereof is attached to the apparatus to be reciprocated, the angle of disposition of the supports defining the path of reciprocating movement of such apparatus.

The main object of the present invention is to provide flexible spring supporting means which is capable of supporting considerable weight and at the same time is adapted to provide the resilience required for proper operation of reciprocating apparatus such as above referred to. In this connection, an important feature of the present invention is in the provision of a composite flexible spring support in which the load-supporting characteristics are provided by one or more components upon which no reliance is placed for resilience, and the resilience or spring action characteristics are provided principally by one or more components having substantially no load-supporting characteristics.

A further object of the invention is to provide a flexible spring supporting means equally adapted to be employed as hanging or strut supports.

Another important object of the present invention is to construct spring supports for reciprocating or vibrating apparatus which can be fastened rigidly to suitable fixed supporting means at one end and to a reciprocating or vibrating member at the other end, and which are of such construction as to prevent any sharp bending in the supports, but to distribute the bends due to strains of operation in a uniform curve along the length of the supports.

Further objects of the invention are: To facilitate assembly of the components of the spring supports; to prevent creeping or displacement of the resilient members of the spring supports relative to each other; to insure that the spring supports will be mounted or assembled in proper position with respect to the operation of the apparatus so that correct operation of the spring supports will be secured; to provide spring supports that require no lubrication after being put into operation; and to so construct the spring supports as to prevent opening and closing movements of the various parts thereof in the operation of the apparatus, thereby preventing slapping of the parts and obviating constant noise, wear, and breakage.

Flexible supports of the character with which the present disclosure is concerned have heretofore been made in the form of strips or legs of wood, or in the form of strips of metal. Wooden strips present comparatively little resilience when made in such proportions as to withstand the compressive load accompanying a strut structure, and in a hanging structure it has been found difficult to produce a wooden support which offers adequate resilience and will at the same time operate for a reasonable length of time without failure. In the formation of flexible spring supports as strips of metal, it has been found necessary in some cases to provide a plurality of spring leaves fastened together in order to obtain the desired resilience, and such supports are subject to rapid deterioration and breakage, particularly where the supports are employed in a position materially inclined to the horizontal as it is not practicable to rely on such leaf-spring supports to sustain the weight of the reciprocating member and the load thereon. As above set forth, the supports of the present invention are adapted primarily for usages where the disposition of the support is in a general up-and-down direction, whereby a reciprocating movement is produced in the supported body having a substantial horizontal component of motion.

In the operation of reciprocating apparatus, such as screens, conveyors, etc., it is generally desirable to place the supporting legs or supports at an angle to the vertical, so as to provide an upward and downward component of motion during alternate strokes of the apparatus, either for the purpose of advancing the material or load along the reciprocating member, or for the purpose of freeing material from the said member so as to prevent adherence or clogging, for example, in the case of a screen, or for other purposes. In general, however, such inclination will not be in excess of 45° from the vertical, and will ordinarily not be in excess of 30° from the vertical.

With such inclined legs or supports, the gravity load of the supported reciprocating member is impressed upon such supports in such manner as to produce both longitudinal and lateral strains within the support itself, that is, strains or stresses which are direct thrusts along the length of the support, and lateral stresses resulting in a tendency for the support to bend from a straight-line position, and the principal purpose of the present invention is to provide for effective resilient support of the gravity load of a reciprocating apparatus under such conditions that the aforesaid lateral stresses are distributed along the length of the support so that localized intensification of the bending stresses is substantially eliminated, thereby enabling the spring supports to operate effectively for an indefinite time and without undue strains.

Other objects of the invention will be brought out in the following specific description thereof, or will be apparent therefrom. The accompanying drawings illustrate embodiments of my invention, and referring thereto:

Fig. 1 is a side elevation of one form of flexible spring support;

Fig. 2 is an edge elevation thereof, certain wrapping means for covering the support being shown partly broken away;

Fig. 3 is a sectional view thereof taken on line 3—3 in Fig. 2;

Fig. 4 is a side elevation of a modified form of spring support;

Fig. 5 is a sectional view thereof taken on line 5—5 in Fig. 4;

Fig. 6 is an inverted horizontal section thereof taken on line 6—6 in Fig. 5;

Fig. 7 is a side view of a portion thereof taken on line 7—7 in Fig. 5;

Figs. 8 and 9 are diagrammatic views illustrating the operation of my invention in distributing the curvature of the spring support in the case of strut and hanging supports, respectively;

Fig. 9a is an edge elevation of a leg or support formed wholly of wooden strips;

Fig. 10 is a side elevation of another form of spring support in which the parts thereof may be held together by bolts traversing the same;

Fig. 11 is an edge elevation thereof;

Fig. 12 is a side elevation of one of the resilient members used in the form shown in Fig. 10;

Fig. 13 is a side elevation of the part shown in Fig. 12;

Fig. 14 is a side elevation of one of the wooden supporting strips used in the form shown in Fig. 10;

Fig. 15 is an edge elevation of the form shown in Fig. 14;

Fig. 16 is a side elevation and Fig. 17 is an edge elevation of one of the metallic separating means inserted between the wooden supporting members in the form shown in Fig. 10;

Fig. 18 is a side elevation of a spring support similar to that shown in Fig. 10 but with only a single bolt hole in each end portion thereof, this figure also showing the wrapping of the support with protective tape;

Fig. 19 is an edge elevation of the form of invention shown in Fig. 18, with the protective tape covering removed;

Fig. 20 is a partial side elevation of a spring support showing application of a water-proof covering or sack which may be applied at each end of the spring support before wrapping with the protective tape;

Fig. 21 is a side elevation of a reciprocating apparatus such as a conveyor or screen, mounted on spring supports of the present invention, which are positioned to act as standing legs or struts inclined backwardly toward the operating mechanism and toward the feed end of the apparatus;

Fig. 22 is a side elevation of a portion of a reciprocating table provided with flexible spring supports of the present invention;

Fig. 23 is a side elevation of a reciprocating screen mounted in part on spring legs constructed according to the present invention and positioned to operate as hanging legs inclined to the vertical;

Fig. 24 is an edge elevation of a modified form of a strut spring support;

Fig. 25 is a diagrammatic view illustrating the distortion thereof under load;

Fig. 26 is a view corresponding to Fig. 24, of a modified form of hanging spring support; and Fig. 27 is a view corresponding to Fig. 25, showing distortion of the form shown in Fig. 26 under load.

The improved spring support of the present invention comprises means for sustaining the longitudinal stresses along the support due to the gravity load of the resiliently supported member, and separate means for resiliently sustaining lateral stresses in the support resulting from such gravity load and the transverse movement of the supported structure. These separate means may be broadly designated as "load-supporting means" and "lateral reinforcing means", and will hereinafter be so referred to. The form of spring support illustrated in Figs. 1 to 3 is primarily adapted for use as a strut support, and in this embodiment the load-supporting means is preferably formed of a material adapted to withstand a longitudinal compressional stress and at the same time be relatively flexible so as to undergo the necessary flexing movements without undue tendency to failure. In this form of the invention, the load-supporting means are shown as elongated strips 1 of wood or equivalent material, each of said strips 1 being of relatively small dimension in the desired direction of flexure (right and left in the plane of Fig. 3) and of relatively large dimension in the direction normal to the direction of flexure (up and down in the plane of Fig. 3). A plurality of strips 1 is preferably employed instead of a single strip of equivalent depth in the direction of flexure so that the increased beam-strength is utilized, the respective ends of the strips being relatively solidly intersecured, as hereinafter set forth.

The lateral reinforcing means preferably comprises a plurality of spring leaves 2 secured to the strips 1 in such manner as to afford the required resilient resistance to deformation of said strips from a straight line, said spring leaves 2 being grouped together in the form of a bundle of leaves of different lengths which are so arranged that the lateral reinforcing unit as a whole tapers gradually from adjacent one end of the support toward the other end thereof. In this particular form of support, a tapered lateral reinforcing means is provided for each end of the load-supporting means, each of said reinforcing means tapering toward the middle portion of said load-supporting means and being oppositely disposed at opposite sides of said means, for the purpose of distributing the lateral or bending stresses in said means, as will be hereinafter brought out.

I prefer to provide fastening means for the upper and lower ends of the support which will maintain the aforesaid parts in proper position without weakening the resilient metal strips 2 in any way, and for this purpose clamps such as shown at the lower end of the leg may be provided. Each of said clamps may comprise a supporting or attaching member 3 and a movable clamp member 4 secured to the member 3 through the agency of suitable tie members such as bolts 5, the respective load-supporting and lateral reinforcing means 1 and 2 of the leg being securely clamped between said members 3 and 4. In this form of the invention, the spring leaves 2 may be wholly imperforate, as shown, thereby preventing any weakness which might arise from perforations therein, the fastening bolts 5 being conveniently arranged at the edge portions of the members 1 and 2 so as to engage said edges and cause said members to persist in lateral alinement.

The load-supporting strips 1 are extended longitudinally beyond the position of the leaves 2, and the outer ends of said strips are preferably brought into compressional engagement with a portion 3' of the support 3 whereby the vertical thrust of the supported member such as a reciprocating screen or the like is applied directly to the top and bottom of the strips 1.

In order to intersecure the respective strips 1 at their upper and lower ends I provide a bolt 6 extending through suitable openings in the members 3 and 4 and through suitable openings 1a in the longitudinally projecting portions of said strips, a block or spacer 7 being inserted between the support 3 and the strips 1 and a block or spacer 7a being placed between the strips 1 and the plate 4, so that the strips 1 and the blocks 7 and 7a are compressively secured between the clamping members 3 and 4. The spring leaves 2 thus terminate short of the position of the bolt 6 and the block 7 which is at the side of the strips 1 at which the base ends of the leaves 2 are disposed and so constructed and positioned that said spring leaves are not subjected to any thrust or compressional stress from the supports 3 at their upper and lower ends.

In the event that the form of support shown in Figs. 1 to 3 is employed as a hanging leg, as indicated in Fig. 9, the longitudinal stress therein is supported through the agency of the bolt 6 engaging in the holes 1a at the upper and lower ends of the support.

Each resilient lateral reinforcing unit may further comprise one or more leaf springs 2' extending nearly the full length of the strips 1 and disposed adjacent said strips, with said members 1 extending beyond the leaves 2' at each end thereof so that said leaves are relieved from the longitudinal stresses, as above described. To insure protection of leaves 1 from undue local stresses, the leaves or strip means 2' extend throughout the portion of strip means 1 which extends between the clamp means 3 and also extend throughout the portion of strip means 1 which is subject to pressure by the clamp means.

While the provision of the leaves 2' is not essential, I have found that the presence thereof is advantageous from the standpoint of preventing a stress intensification on the outer strips 1 at the bearing point of the free end of the next longest spring leaf 2a. The several spring leaves 2, 2', and 2a are preferably intersecured to prevent relative displacement thereof, as by means of a metallic connection by brazing or the like at their alined ends as at 10. The individual lateral reinforcing units may thus be handled conveniently in assemblying the parts of a leg or support in position and clamping them between the supporting clamp means 3 and 4, without the difficulty which would otherwise arise from the parts slipping on one another.

To minimize wear and friction between the wooden strips 1 and to obviate the necessity of lubrication when in use, I prefer to treat said strips by impregnating the same with a suitable lubricant, as by soaking in lubricating oil for a month or so, so that they are fully impregnated with such oil. In order to protect the strips 1 and the leaves 2 of the spring support from entrance of dust, water, et cetera, to bind the strip members of the spring leg together while in operation and also to facilitate assembly of the parts in proper position, I prefer to wrap such elements with a flexible adhesive waterproof material, such as friction tape, preferably wound in two layers as indicated at 8 and 9, these layers being wound in opposite directions so that the overlap of one layer is directed oppositely to the overlap of the other layer. This not only gives a firmer binding action on the components of the spring support, but also insures against entry of water or dust through the wrapping. It will be comprehended that a suitable lubricant may be placed between the several leaves 2, 2', and 2a, if desired, before assembly of the support.

To insure that the spring supports are assembled in proper position in the attaching brackets, so that the lateral reinforcing members are directed properly with respect to the direction of lateral stresses produced in the supports when is use, the attaching bracket or support means may be formed with a fillet as indicated at 12 at the angle between the parts 3 and 3' and the block or spacer 7 may be cut away as shown at 13 so that it may be inserted in position as shown in Fig. 2. With such a construction, if it were attempted to insert the spring support within the attaching means in a reversed relation to that required, the lower end of one of the strips 1 would strike the fillet 12, indicating to the workman that this was the wrong position.

The operation of the device of the present invention when applied as a strut support may be explained by reference to Fig. 8. At the left of this figure is shown a flexible support or strut 15 rigidly mounted at its respective lower and upper ends to a fixed support 16 and a reciprocating member 17. With such a construction, if the member 15 is of sufficient flexibility to provide any considerable stroke for the member 17 and is inclined at any appreciable angle to the vertical, there is a pronounced tendency for said member to bend sharply at or near the points where it is attached to the members 16 and 17, as shown at a, producing a stress intensification which will induce failure through fatigue. By providing a flexible member 18 as shown at the right in Fig. 8, reinforced against lateral stresses by resilient means 19 and 20 in the manner indicated, the curvature or deflection of said member 18 may be distributed in a uniform curve between the points of attachment to the lower and upper members 16 and 17, eliminating stress intensification at any point and materially decreasing the maximum angular distortion of the member 18 over that experienced by the member 15.

Fig. 9 illustrates the operation of the invention in the case of a spring support of the hanging type, that is to say, in which the reciprocating member indicated at 21 is supported from a fixed frame 22 by flexible supports. In this case, the flexible support such as indicated at 23 tends to bend sharply at or near the points of attachment to the upper and lower members 22 and 21, as indicated at b, but by means of resilient lateral reinforcing members 24 and 25 applied to a flexible supporting member 26 as indicated at the right-hand side of said figure, the deflection or curvature of the flexible member may be distributed in a uniform curve between its points of attachment to the members 21 and 22. The operation of the structure is similar to that described in connection with Fig. 8 except that the double curvature in the case of the hanging support is opposite to that which exists in the case of the strut support shown in said last-named figure. In order to illustrate the use of a support member in which the lateral reinforcing means are arranged as shown in Fig. 2, the inclination of the supports 18 and 26 are relatively reversed to accommodate for the strut and hanging arrangement, and the respective reinforcing means are retained in a common relation.

The load-supporting strips 1, by virtue of the provision of lateral reinforcing means and the wrapping means which preserves the various components in their desired relation, are rendered capable of withstanding the direct longitudinal stresses which are necessary to provide the desired gravity-load support, without buckling. This construction makes it possible to employ a material such as wood for the load-supporting members, in which the inherent non-crystalline physical nature of this material is of particular advantage, that is, such material is not subject to fatigue failure due to the grain growth or the development of fatigue lines along grain boundaries, in contrast to the tendency of most metals. In place of wood for a strut I may employ any suitable non-crystalline material, such as a bakelite composition or other synthetic resin, reinforced, if desired, with fibrous materials, or a fabric material vulcanized within a relatively hard rubber composition. Such load-supporting members will obviously possess some inherent resistance to deformation due to lateral stresses, but this property is not relied upon according to the present invention, the main property relied upon being that of withstanding the load-supporting stress in the length of the member while being sufficiently flexible to accommodate itself to the lateral distortion necessary to establish the necessary flexure in the support member to produce the desired reciprocating movement at one end thereof. Wood or a like material will break or rupture when distorted beyond the point of resilient return, and the distribution of the bending stresses along the length of the support after the manner delineated in Figs. 8 and 9 serves to prevent such stress intensification as will cause breakage.

Where the load-supporting members are placed purely in tensional stress, as in the case of a hanging leg or support, thin metal strips may be employed as hereinafter set forth, although it will be appreciated that in this case also the inherent resilience of such strips is of secondary consideration and the ability of such strips to sustain the tensional load is the important factor. In some cases a substantially non-resilient material, such as rubber belting or the like may be employed for the load-supporting member, wherein the desired tensional strength is secured without influencing in any way the ability of the entire support structure to resist lateral flexure.

The lateral reinforcing means is also capable of relatively long life, due to the fact that such means is required only to resist bending stresses, and may therefore be designed solely to that end. The composite support structure is therefore one in which each element works in its own way to do its part in the resilient support of a gravity load, and the operation of each component makes possible the proper operation of the other component. The material of which the lateral reinforcing means is formed is necessarily one having a much higher resistance to fracture in response to bending stresses than the material of which the load-supporting means is formed, as the load-supporting capability of such last-named means is dependent upon the limiting action of the lateral reinforcing in preserving the contour of flexure of such load-supporting means. The most advantageous material for such lateral reinforcing members has been found to be high-tensile spring steel.

While I prefer to make the longitudinal-stress supporting means of wood as above described, such means may, if desired, consist of metal strips either of the same metal or a different metal from the lateral-stress supporting means. Such a construction is shown in Figs. 4 to 7 and comprises a central set of strips 30 adapted to take longitudinal stress and a set or bundle of resilient strips or spring leaves 31 at each side thereof and adapted to resist lateral stresses only, the successively overlying strips 31 being of progressively shorter length so as to distribute the curvature due to lateral stresses in the manner above described. The complete leg or support consisting of members 30 and 31 may be clamped at its respective ends to an attaching means 32 by means of a U clamp plate 33 and fastening bolt 34, said bolt passing through perforations 35 in the respective strips 30 and 31. The attaching means may be provided with a fillet 36 and the strips 30 may be cut away as shown at 30' to provide space for said fillet when the parts are properly assembled, reverse assembling of the parts being prevented by engagement of the ends of strips 31 with said fillet. One or more of the strips 31, as indicated at 31a, may extend nearly the full length of the strips 30, being preferably slightly shorter than the latter and provided with an enlarged hole 31b for receiving the bolt 34, so that while the clamping means hold said strip 31a permanently against lateral displacement, it permits a slight end-wise movement resulting from bending of the parts. The operation of this form of my invention is similar to that above described, but it will be understood that this form of the invention is particularly adapted to use where the reciprocating load is suspended from a fixed support, or as a hanging leg, and is not so well adapted for use as a strut. The strips 30 for taking the longitudinal stress which in this case is tensile stress may be made of any suitable flexible material, for example, they may be made of material which has little if any resilience, such as soft steel, copper, leather or rubber belting.

If desired, the form of my invention comprising wooden or similar strips for taking the longitudinal stresses and resilient metal strips for taking the lateral stresses may be constructed as shown in Figs. 10 through 17. This construction comprises wooden strips 38 separated by resilient metal strips 39 and provided with resilient lateral reinforcing means at each side consisting of leaf springs 40. The wooden strips 38 and metal strips 39 and 40 are provided with openings 41, 42, and 43 respectively for receiving fastening bolts whereby the leg may be attached to suitable supports at its respective ends, two openings being in this case shown near each end, the holes in the members 39 and 40 being somewhat larger than the holes in the members 38 and the members 38 projecting beyond the upper and lower ends of the members 39 and 40, so that engagement with the supporting means at the upper and lower ends of the legs is wholly with the wooden members 38 and the members 39 and 40 are subjected only to lateral stresses. The members 40 are preferably connected together by brazing or other suitable means as indicated at 44.

Figs. 18 and 19 show a similar construction to that of Figs. 10 to 17, except that but a single hole for the attaching bolts is provided near each end of the respective wooden strips 46 and spring leaves 47 of the leg, as shown at 45 and 45a respectively. Fig. 18 also illustrates the reverse wrapping of the spring leg with friction tape or the like as indicated at 48. The reverse wrapping with friction tape or the like is so arranged that the overlap in both layers is oppositely directed, so that when the legs are assembled in the reciprocating apparatus the exposed edges of one of the layers of tape are directed downwardly, giving a shingled effect preventing entrance of water. If desired, instead of such wrapping or in addition thereto, the spring leg may be provided at one or both ends with a covering comprising a sack of suitable water-proof flexible material as indicated at 49 in Fig. 20.

Fig. 21 illustrates the application of the improved spring legs in connection with a reciprocating member which may be a screen, conveyor, or other reciprocating member indicated at 50 mounted on a fixed frame 51 by means of spring legs 52 which may be of the same construction as that above-described and are inclined to the vertical so that operation of the member 50 by suitable operating means such as eccentric head motion 53 will cause reciprocation of member 50 in the direction of the arrow, resulting in an upward throw at each forward stroke for the purposes well known in the art. Such motion requires considerable inclination to the vertical of the supporting spring legs, resulting in a serious tendency to buckling and bending of the spring legs and it has been found that leg constructions such as have heretofore been used are not well adapted to withstand the bending stresses produced in such cases. For example, the form of leg shown in Fig. 9a, consisting of wooden strips attached at their upper and lower ends respectively to the reciprocating member and to a fixed support by attaching means 55 and 56, while adapted for use in a nearly vertical position, is not suitable for use when considerably inclined to the vertical for reasons above stated. Moreover, such wooden strips lack the necessary permanent resilience to enable the reciprocating member to operate efficiently as they soon break due to permanent deformation of the wood under the stresses of operation, and are subject to undue wear and tear. Thus, as indicated in dot-dash lines in Fig. 9a, the wooden strips tend to become set or bent out from the underlying strips due to the inability of wood to withstand the intense bending stresses at the point of attachment so that their reinforcing action is lost, and if it is attempted to prevent such set of the wood by binding or strapping around the bundle of wooden strips, the legs soon become useless due to cutting of the wood or to deterioration of the binding means. In this connection an important feature of my invention is the provision of lateral support at the legs by strips (namely, the metal leaf springs) which are permanently resilient under the operation of the apparatus. On the other hand, wooden strips, particularly in the case of standing legs, have a marked advantage over metal strips for sustaining the weight of the load without fatigue failure in that they may be made to present much greater resistance to buckling under load or pressure in a direction longitudinally of the strips.

Fig. 22 shows the application of the invention in connection with a reciprocating table in which the motion is substantially horizontal, the table indicated at 58 being mounted on supporting frame 59 by means of spring legs shown at 60 constructed as above described and being operated, for example, by unbalanced pulley 61.

Fig. 23 shows the application of hanging legs, one of which is shown at 64 in support of a reciprocating or vibrating means such as a screen 65 which is mounted on a frame 66 by means of legs 64 and other suitable screen supports such as spring means 67 at the other end of the screen, the screen being operated, for example, by means of an unbalanced pulley 68. In this case, it is also desirable to have the spring legs 64 set at a considerable angle to the vertical in order to provide for an oblique or inclined motion of the screen in the manner shown by the arrows, and the construction of the spring legs as above described enables the legs to be mounted at such angle as is effective for this purpose and at the same time withstand the resulting stresses and operate efficiently in facilitating the vibratory action of the screen.

In Figs. 24 and 27, I have illustrated a modified form of spring support, and referring particularly to Figs. 24 and 25 a fixed support is shown at 71 carrying a bracket 72 provided with a clamping plate 73 and clamping means such as bolts 74. The flexible support may comprise one or more load-supporting members 75 and a plurality of lateral reinforcing members 76 of differing lengths to form a tapered bundle of spring leaves intersecured with the members 75 at the base end through the agency of the bracket 72 and the clamping means 73 and 74. The reciprocating member 77 may be provided with a pivot bracket 78 adapted to receive a clamp 79 which fits over and is secured to the upper ends of the load-supporting members 75. A suitable covering means may also be provided for the spring support as by means of a double layer of tape or the like oppositely wound in the manner and for the purpose hereinbefore described. Fig. 25 illustrates the deflection of a spring support of the type shown in Fig. 24, wherein the reinforcing relation of the spring leaves 76 is clearly brought out. Metal strips 75a may be provided at opposite sides of the members 75 to take the wear at the support points, as hereinbefore described.

Referring to Figs. 26 and 27, a fixed support is shown at 82 provided with a bracket 83, provided with a clamping plate 84 and suitable clamping bolts such as 85 and the load-supporting member 86 is shown as comprising one or more strips of flexible material such as rubber or leather belting, or the like, secured at their upper ends to the bracket 83 and at their lower ends to a pivot bracket 87 mounted on a reciprocating member 88, through the agency of a suitable clamp member 89 and clamping means such as bolts 90. The lateral reinforcing means may comprise a plurality of spring leaves 91 tapering downwardly from the support 83 in the general manner and for the purpose hereinbefore set forth. Supporting the lower side of the load-supporting member 86 and providing the desired resilience for the entire structure. The spring leaf 92 adjacent the member 86 is preferably extended into the clamping means 83, 84, and 89, 90 to protect said member against localized wear from the spring members 91. A typical deformation of this type of spring support under load is illustrated in Fig. 27.

In each of the above-described forms of both hanging and strut type flexible support structures, the clamping plates for the respective attaching members are preferably provided with a hook or finger, such as shown at 4a, 73a, and 84a respectively in Figs. 2, 24, and 26, to prevent displacement of the respective clamping bolts, as will be apparent to one skilled in the art. The form of clamp plate shown in Figs. 4 to 6 does not require such an attachment device in view of the function of the U plate 33 in this regard.

It will be appreciated that the above-described and delineated embodiments of the invention are exemplary only, and I do not choose to be limited to such specific forms as are herein disclosed, but rather to the scope of the following claims.

I claim:

1. A flexible spring leg for reciprocating apparatus comprising a central strip means formed of a non-crystalline material extending longitudinally of the leg and adapted to withstand compressive stresses in the direction longitudinal to the leg; lateral reinforcing means composed of strips of permanently resilient material extending on opposite sides of the aforesaid central strip means, and clamp means at the respective ends of the spring leg provided respectively with means for rigid attachment to its support and with means for rigid attachment to the reciprocating apparatus, the clamp means at each end of the spring leg rigidly securing the reinforcing means to the central strip means and to the clamp means, the permanently resilient strip means at each side of the central strip means comprising a bundle of metallic spring leaves, and each of said bundles tapering from near one end of the leg toward the other end thereof, and the taper of said bundles being on opposite sides of the leg, so as to distribute the lateral stresses along the length of the leg and prevent undue curvature of the leg at any portion thereof under the strains due to longitudinal and lateral stresses and the inner member of each bundle being in contact with the central strip means and extending throughout the portion of the central strip means which extends between said clamp means at each end of said leg and also extends throughout the portion of the central strip means which is subject to pressure by the clamp means.

2. A construction as set forth in claim 1 in which the central strip means extends beyond the bundle of permanently resilient strips at each end of the leg in such manner that, when clamped in suitable supporting means at each end of the leg, the thrust engagement of the supporting means with the leg will be wholly with the central portion thereof.

3. A spring leg for reciprocating apparatus, which comprises: a central load-supporting portion adapted to resist stresses applied longitudinally thereof; a side portion disposed at each side thereof and comprising a bundle of permanently resilient leaf springs tapering from one end of the leg toward the other end, the taper of said bundles being opposite on opposite sides of said leg, and said central load-supporting portion extending longitudinally beyond said side portions; clamping means at one end of said leg for securing the portions of the leg together and for securing the leg to a reciprocating member; and clamping means at the other end of said leg for securing the portions of the leg together and for securing the leg to a support, each of said clamping means having a portion engaging said projecting portion of said load-supporting portion at one end of the leg whereby the load of such reciprocating member carried by said leg is supported wholly by said central load-supporting portion, the permanently resilient side portions of said leg being secured to said central portion by said clamping means in such manner as to resist lateral stresses in said leg but not to be subject to longitudinal stresses in said leg.

4. A construction as set forth in claim 3, wherein each end of said leg is asymetrically formed and one of said clamp means is correspondingly formed in such manner as to receive said leg in one position only, whereby the taper of said bundles with respect to said load-supporting portion is established in a definite relation to the load supported by said leg.

5. A flexible spring leg for reciprocating apparatus consisting of a central portion comprising wooden strips and side portions each composed of a bundle of metallic spring leaves, each bundle tapering from the portion thereof adjacent an end of the leg toward the other end of the leg and the taper of said bundles being opposite on opposite sides of the leg, at least one of the metallic spring leaves at each side of said central portion extending substantially the full length of said central portion and clamp means at the respective ends of the spring leg provided with means for rigid attachment of the clamp means to a support and to the reciprocating apparatus and each clamp means being provided with means for rigidly securing the bundle of metallic spring leaves at one side of said central portion and at least one metallic spring leaf at the other side of said central portion to the wooden strips and to the clamp means.

6. The construction as set forth in claim 5 and comprising in addition wrappings of flexible adhesive water-proof material wrapped in opposite directions around the leg and binding the parts thereof together and serving as a protective covering therefor.

7. A flexible spring leg for reciprocating apparatus comprising a central portion formed with wooden strips extending longitudinally of the leg and a portion at each side of said central portion formed of a bundle of leaf springs, said bundle tapering from near one end of the leg toward the other end, the taper of said bundles being oppositely directed on opposite sides of the leg, the central portion of the leg extending beyond the side portion thereof at each end of the leg, and clamping means engaging each end portion of the leg and clamping the side portions and central portion together laterally, said clamping means having a portion engaging longitudinally with the central portion of the leg, but being free of longitudinal engagement with said side portions of the leg so that longitudinal stresses on the leg are applied only to said central portion, and said clamping means at the respective ends of the leg being provided with means for attachment to a member to be reciprocated and to a support therefor.

8. A flexible spring leg for reciprocating apparatus having a covering of flexible water-proof adhesive tape wrapping around said spring leg in opposite directions in two or multiple layers, the tape in each layer overlapping upon itself and the overlapping in one layer being opposite to the overlap in the other layer.

9. A flexible spring leg for reciprocating apparatus comprising an elongated load-supporting member positioned to support such load under stresses established longitudinally in said member, said member being formed of a non-crystalline material, and a metallic lateral reinforcing member secured to said load-supporting member in position to resist lateral stresses therein in one direction, said metallic reinforcing member being formed of a material having a greater resistance to fracture under bending stresses than said non-crystalline material.

10. A flexible spring leg for reciprocating apparatus comprising load-supporting flexible strip means extending longitudinally of the leg and adapted to withstand compressive stresses in the direction of the length thereof, lateral reinforcing means including a bundle of permanently resilient strip members at each side of the load-supporting strip means, and clamp means at the respective ends of the spring leg and provided respectively with means for rigid attachment to a support and for rigid attachment to the reciprocating apparatus, each clamp means clamping the load-supporting strip means and reinforcing strip means to one another and to the clamp means, the innermost member of each bundle of resilient strip members extending between and into clamped engagement with the respective clamp members and the other members of each bundle of resilient members tapering in length from one end of the spring leg toward the other end, the taper being in reverse direction on opposite sides of the spring leg.

11. A flexible spring leg for reciprocating apparatus consisting of strip means extending longitudinally of the leg, clamp means at respective ends of the strip means and provided respectively with means for rigid attachment to a support and for rigid attachment to the reciprocating apparatus, and a covering of flexible waterproof adhesive tape material wrapped around said strip means of the spring leg in opposite directions in two or multiple layers, the tape in each layer overlapping upon itself and the overlapping in one layer being opposite to the overlap in the other layer so as to bind said strips together and prevent entrance of water or dust therebetween.

12. A flexible spring leg for reciprocating apparatus, which comprises: an elongated load-supporting means positioned at an angle to the horizontal in load-supporting relation to a reciprocating apparatus and adapted to withstand compressive stresses in the direction of the length thereof and adapted to flex in response to stresses applied transverse to the length thereof; and lateral reinforcing means including a bundle of elongated permanently resilient spring elements secured to said load-supporting means adjacent one end thereof in position to reinforce said load-supporting means at said one end with respect to flexure thereof in one direction transverse to the length thereof, said bundle of spring elements tapering from one end of leg toward the other end thereof and the spring elements of said bundle being integrally secured together at the larger end of the bundle.

13. As an article of manufacture a reinforcing means for a spring leg, comprising a bundle of resilient flat strip members extending side by side in contact with one another and forming a bundle tapering from one end to the other end, the strip means at the larger end portion of the bundle being secured together by a fused metallic connection.

14. A flexible spring leg for reciprocating apparatus comprising a central strip means formed of a non-crystalline material extending longitudinally of the leg and adapted to withstand stresses in the direction longitudinal to the leg and lateral reinforcing means composed of strips of permanently resilient material extending on opposite sides of the aforesaid central strip means, the permanently resilient strip means at each side of the central strip means comprising a bundle of metallic spring leaves, and each of said bundles tapering from near one end of the leg toward the other end thereof, and the taper of said bundles being on opposite sides of the leg, so as to distribute the lateral stresses along the length of the leg and prevent undue curvature of the leg at any portion thereof under the strains due to longitudinal and lateral stresses, said central strip means extending beyond the bundle of permanently resilient strips at each end of the leg in such manner that, when clamped in suitable supporting means at each end of the leg, the thrust engagement of the supporting means with the leg will be wholly with the central portion thereof.

GUSTAVE A. OVERSTROM.